United States Patent Office

3,580,824
Patented May 25, 1971

---

3,580,824
IMPREGNATED GRAPHITE

John E. Currey, Morris P. Grotheer, and Edward H. Cook, Jr., Lewiston, N.Y., assignors to Hooker Chemical Corporation, Niagara Falls, N.Y.
No Drawing. Filed Dec. 31, 1968, Ser. No. 789,008
Int. Cl. B01k 1/00; C01b 11/26
U.S. Cl. 204—95      11 Claims

ABSTRACT OF THE DISCLOSURE

Graphite impregnated with iron in an amount between about 0.05 to about 3 percent by weight affords an excellent electrode material for the electrolysis of alkali metal halides. Electrode over voltage is decreased and electrode life is prolonged by iron deposition in comparison to conventional graphite electrodes.

BACKGROUND OF THE INVENTION

In general, graphite anodes have been employed in electrolytic processes for the electrolysis of aqueous solutions of alkali metal halides, both in the production of halogens and caustic as well as alkali metal halates. The cost of graphite is a large factor in the overall price of electrolytic cell products. Graphite presents a relatively larger cost factor in chlorate production than in chlor-alkali production. Conventionally, to improve electrode life, the electrode graphite is impregnated with a drying oil which tends to prevent wetting on the interior of the graphite by an aqueous electrolyte.

BRIEF SUMMARY OF THE INVENTION

In accordance with the instant invention, there is provided an electrode material comprising a massive graphite structure impregnated with iron. By weight, based upon the final product, between 0.05–3 percent iron, and preferably, 0.05–2.5 percent iron may be present in the graphite matrix. More than 3 percent iron does not appear to provide any advantage within the purview of the instant invention.

Moreover, the instant invention provides iron impregnated graphite structures as anodes, and the process for using such anodes in the electrolysis of an alkali metal halide electrolyte. Furthermore, this invention provides a method whereby the impregnated graphite electrodes of this invention may be produced.

Graphite, of various grades of porosity, may be impregnated with iron by subjecting the graphite in an evacuated state to a solution containing a soluble iron salt under pressure, to force the solution into the pores of the graphite. The iron salt within the porous graphite matrix may then be treated to convert it to a hydrated ferric oxide. The graphite structure is then subjected to calcination at an elevated temperature in an inert atmosphere for a sufficient period of time to produce α-iron.

More specifically, the graphite which is employed in the instant invention may be porous fuel cell grade graphite or standard anode grade graphite. Exemplary of the graphite matrixes under consideration are porous graphite having an apparent density of 0.936 and approximately 58.4 percent voids by volume; porous graphite of apparent density 1.04 having approximately 53.8 percent voids by volume and anode grade graphite of apparent density 1.67 having approximately 25.6 percent voids by volume. These calculated voids are based upon a standard theoretical specific gravity for graphite of 2.25. The preferred graphite for the electrolytic purposes of this invention is preferably that of apparent density between 1.40 and 1.80. The graphite matrix, described in the preceding paragraph, is subjected to heat and evacuated, followed by treatment with an aqueous solution of iron salt. The iron salt may be caused to substantially fill the pores within the graphite matrix either through application of pressure or at atmospheric pressure. Any of the various water soluble iron salts may be employed in the impregnation step; i.e. ferric or ferrous chloride, nitrate, acetate, formate, and similar salts as well as ferric complexes with chelating or sequestering agents such as ethylenediaminetetraacetic acid, may be employed.

The impregnated iron salt may optionally be converted to a hydrated oxide by treatment with ammonia or ammonium hydroxide. It is advantageous to employ pressure in conjunction with treatment with ammonium hydroxide to insure complete hydrolysis.

The resulting graphite structure is air dried and subsequently placed in a furnace for calcination. Calcination is performed at a temperature between approximately 800° C. and 2000° C. for periods of time which may vary from a few minutes to about 4 hours. The time factor employed in the calcination step does not appear to be a critical process parameter, in that heat may be applied for extended periods of time without any noticeable change in the properties of the resulting impregnated graphite. However, for practical purposes it appears that a heating period of approximately one hour is sufficient at 1400° C., and approximately 2 hours at 1000° C. to obtain the desired result. To insure a maximum amount of α-iron formation, it is preferred to employ a temperature between 1300 and 1600° C. An inert atmosphere is maintained in the calcination furnace during the roasting period to avoid air oxidation of the graphite. The inert atmosphere may be any atmosphere well known to the art such as argon or nitrogen. Similarly, a sand packing may be employed to effectively seal the graphite from atmospheric oxygen.

The resulting iron impregnated graphite may be optionally post impregnated with a conventional drying oil such as linseed oil, or it may be used directly as an anode material. It is preferred to seal the iron impregnated graphite with oil to prevent excessive attack by the corrosive contents of the electrolytic cell.

DETAILED DESCRIPTION OF THE INVENTION

The following example is given for purposes of illustration only and is not to be taken as a limitation on the inventive process of the instant disclosure.

Example 1

A section of anode grade graphite was placed in an autoclave and evacuated to a 27.5 inch mercury vacuum at 120° C. A solution containing 165 grams per liter of anhydrous ferric chloride was added to the evacuated autoclave and the temperature was raised to 150° C. at a pressure of 60 lbs. per square inch gauge. The autoclave was maintained under these conditions for one hour, at which time the autoclave was evacuated and a solution of 30 percent ammonium hydroxide was introduced. The temperature of the autoclave had decreased to 100° C. at the time of the addition of ammonium hydroxide. The temperature was again increased to 130° C. at a pressure of 34 lbs. per square inch gauge. The heat was turned off and the pressure was allowed to decrease to 10 lbs. per square inch gauge at which time the autoclave was emptied and the graphite removed. The graphite was dried in an oven at 100° C. and subsequently transferred to a furnace. The graphite structure was roasted at 1400° C. under an argon purge for a period of one hour.

Additional graphite sections were prepared in accordance with the details of the preceding paragraph except that the roasting furnace temperature was maintained respectively at 800° C., 1000° C. and 1200° C.

Additional graphite sections were treated in accordance with the process set forth in Example 1, supra, and were individually heated for periods of 1, 2 and 3 hours at temperatures of 800° C. and 1000° C.

Anodic polarization studies of the prepared iron impregnated graphite material were performed by masking with liquid latex rubber all but one square inch of exposed electrode surface. The polarization measurements were made in a stainless steel box cell. A Teflon cloth diaphragm separated the anolyte from catholyte. The electrolyte was 295 grams per liter sodium chloride at 90° C. An Anotrol Model 4100 potentiostat in conjunction with a Houston X-Y recorder was used to obtain the anodic polarization. Three sets of three curves were run for each sample using different points of reference on the square inch of exposed electrode surface. The following data obtained. In Table I the expression amp/in.$^2$ refers to amperes per square inch.

TABLE 1.—ANODE POTENTIALS (SATURATED CALOMEL ELECTRODE)

|  | Volts | |
| --- | --- | --- |
|  | 1 amp/in.$^2$ | 10 amps/in.$^2$ |
| Blank (no treatment) | 1.38 | 1.75 |
| 800° C | 1.32 | 1.50 |
| 1,000° C | 1.25 | 1.48 |
| 1,200° C | 1.18 | 1.41 |
| 1,400° C | 1.16 | 1.33 |

Sections of graphite impregnated with an aqueous solution of ferric chloride and treated in accordance with the procedure set forth in Example 1, were analyzed by X-ray diffraction. The analysis effectively identified and distinguished phases representing at least two percent by weight of an element or compound. This analytical technique demonstrated that at calcination temperatures below 800° C., reduction of hydrated iron oxide was incomplete with the formation of iron oxides predominately $\alpha$-$Fe_2O_3$ and a small amount of $Fe_3O_4$ (magnetite) as well as possibly small amounts of iron carbides such as $Fe_2C$ and $Fe_3C$. At temperatures of 450 and 500° C. with air present during the calcination step, a short period calcination resulted in no detectable reduction to $\alpha$-iron, with formation of mixed iron oxides including possibly a trace of magnetite or an iron carbide, while an extended calcination period (24 hours) produced predominate amounts of $\alpha$-$Fe_2O_3$.

The following example illustrates the comparative consumption rate of iron impregnated graphite electrodes as opposed to conventional graphite electrodes.

Example 2

A sample of graphite (2.54 centimeters x 3.84 centimeters x 1.63 centimeters) were impregnated with ferric chloride. The impregnated graphite was subsequently subjected to a high temperature roasting process to convert the ferric chloride to iron. The graphite was coated with latex rubber to expose a 1 square inch surface area. An untreated sample (2.50 x 3.79 x 1.53 centimeters) was prepared in a similar manner. These samples were placed in separate 800 milliliter beakers in an electrolyte of 200 grams/liter sodium chlorate and 100 grams/liter sodium chloride. The graphite samples were operated as anodes at approximately one ampere/square inch for 20 hours.

Following the test, the thickness of the electrodes was measured with a micrometer. The thickness of the untreated sample had decreased by 0.1 centimeter (0.164 gram weight loss) whereas there was no measureable change in the electrode impregnated with iron.

Example 3

Iron impregnated graphite electrodes of both chlorate and chlor-alkali grade, prepared in accordance with this invention without oil treatment of the graphite, were compared to conventional chlorate type anode graphite stock which is oil treated.

The following data was obtained by electrolyzing a solution containing 300 grams per liter (g./l.) sodium chloride in a cell operating at 340 amperes at a current density of 0.8 ampere per square inch. Make-up brine was added and the electrolysis was terminated at the final sodium chloride concentrations listed. The temperature of the electrolyte was approximately 45° C. during the electrolysis. The pounds per ton (lbs./ton) of anode loss per chlorate produced illustrates a decided advantage over conventional anode graphite.

TABLE II

|  | Final concentration, g./l. | | Current efficiency | Anode loss, lbs./ ton $NaClO_3$ |
| --- | --- | --- | --- | --- |
|  | $NaClO_3$ | NaCl | | |
| (I) Chlorate Graphite [1] | 525 | 138 | 76.8 | 20.0 |
|  | 492 | 149 | 85.8 | 19.4 |
|  | 522 | 136 | 91.0 | 23.9 |
|  | 578 | 104 | 85.9 | 20.3 |
|  | 588 | 103 | 91.3 | 23.6 |
| (II) Chlor-alkali graphite [2] | 540 | 104 | 87.5 | 7.9 |
|  | 476 | 137 | 87.8 | 4.3 |
|  | 363 | 166 | 86.8 | 6.3 |
|  | 370 | 176 | 88.0 | 9.0 |
|  | 450 | 152 | 85.2 | 11.1 |
|  | 463 | 154 | 86.8 | 10.5 |
| (III) Chlorate graphite [2] | 421 | 150 | 83.7 | 4.9 |
|  | 443 | 154 | 85.8 | 4.3 |
|  | 449 | 154 | 85.7 | 7.25 |
|  | 393 | 163 | 84.0 | 6.9 |
|  | 440 | 155 | 82.3 | 7.25 |
|  | 434 | 147 | 82.3 | 8.0 |

[1] Oil treated.
[2] Iron impregnated.

From the preceding data, it may be seen that the commonly employed oil impregnated chlorate type graphite electrodes are consumed (based upon thickness measurements) at a rate between 19.4 and 23.9 pounds of graphite per ton of sodium chlorate produced. Chlor-alkali type graphite, when impregnated with iron and no oil is consumed at a rate between 4.3 to 11.1 pounds per ton of sodium chlorate, while chlorate type graphite impregnated with iron and no oil is consumed at a rate between 4.3 and 8.0 pounds per ton of chlorate. With oil impregnation, the consumption rate of iron impregnated graphite electrodes may be further decreased by minimizing internal electrolytic attacks.

During the electrolysis presented in Example 3 the increase in cell voltage with decrease in NaCl concentration is considerably less with an iron impregnated graphite electrode than it is with a conventionally oil treated graphite electrode. For example, during a comparative experiment employing a normal chlorate graphite electrode with an iron impregnated chlorate graphite electrode, as the concentration of NaCl decreased from about 250 grams per liter to about 150 grams per liter, the cell voltage increased from about 3.25 volts to 3.6 volts with the normal graphite while with iron impregnated graphite, the increase in cell voltage was from about 3.15 to 3.35 volts.

Although it is believed that the iron deposits in the iron impregnated graphite of this invention is singularly found in the pores of the graphite matrix, it is applicants' desire not to be bound by that theory because a portion of the iron may actually be in an intercalated state. Hence, it is desired to cover the invention in any of its operative forms as iron impregnated graphite whether that iron appears in intercalated form or as heterogeneous deposits within the pores of the graphite matrix.

What is claimed is:

1. A carbon electrode containing impregnated iron in an amount between about 0.05 to 3 percent by weight.

2. The electrode of claim 1 in which between 0.05 and 2.5 percent iron is present in said carbon.

3. The electrode of claim 1 in which said carbon electrode comprises graphite impregnated with from about 0.05 to 3 percent by weight of iron and from about 2 percent to a trace quantity of at least one member of the group consisting of an iron oxide and an iron carbide.

4. The electrode of claim 1 in which said carbon is graphite having an apparent density between 1.40 and 1.80.

5. A formed massive graphite structure impregnated with from 0.05 to 3 percent $\alpha$-iron by weight, said graphite being of apparent density between about 1.40 and 1.80 prior to impregnation.

6. An electrolytic process which comprises
   (a) providing an aqueous electrolyte containing an alkali metal chloride in an electrolytic cell including an electrode positioned within said solution, said electrode comprising an iron impregnated massive graphite structure,
   (b) passing an electrolyzing current through the electrode and electrolyte with the electrode as an anode, and
   (c) recovering a product of said electrolysis.

7. The process of claim 6 in which an alkali metal chlorate is a recovered product.

8. The process of claim 6 in which chlorine and an alkali metal hydroxide are recovered products.

9. A process for the production of an electrode which comprises;
   (a) impregnating an electrode containing graphite with an aqueous solution of an iron salt;
   (b) converting said impregnated iron salt to a hydrated iron oxide; and
   (c) calcining said impregnated electrode containing graphite at a temperature between about 1300 and 2000° C. in an inert atmosphere.

10. The process of claim 9 in which said electrode containing graphite has an apparent density between 1.40 and 1.80.

11. The process of claim 9 in which said impregnated iron salt is converted to a hydrated iron oxide by treatment of the impregnated electrode containing graphite with ammonia or ammonium hydroxide.

References Cited

UNITED STATES PATENTS

| | | | |
|---|---|---|---|
| 3,329,594 | 7/1967 | Anthony | 204—95 |
| 2,797,192 | 6/1957 | Graff | 204—95 |
| 2,669,598 | 2/1954 | Marko | 136—122 |
| 3,254,143 | 5/1966 | Heitman | 264—29 |
| 1,492,302 | 4/1924 | MacMillan | 204—294 |

DANIEL E. WYMAN, Primary Examiner

P. M. FRENCH, Assistant Examiner

U.S. Cl. X.R.

204—94, 294